(12) United States Patent
Satoh

(10) Patent No.: US 9,090,481 B2
(45) Date of Patent: Jul. 28, 2015

(54) POSITIVE ELECTRODE ACTIVE MATERIAL FOR LITHIUM-ION BATTERY, POSITIVE ELECTRODE FOR LITHIUM-ION BATTERY, AND LITHIUM-ION BATTERY

(75) Inventor: Hirohito Satoh, Kitaibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 370 days.

(21) Appl. No.: 13/582,087

(22) PCT Filed: Feb. 21, 2011

(86) PCT No.: PCT/JP2011/053710
§ 371 (c)(1),
(2), (4) Date: Aug. 31, 2012

(87) PCT Pub. No.: WO2011/108389
PCT Pub. Date: Sep. 9, 2011

(65) Prior Publication Data
US 2013/0004849 A1 Jan. 3, 2013

(30) Foreign Application Priority Data
Mar. 4, 2010 (JP) ................. 2010-048144

(51) Int. Cl.
*H01M 4/131* (2010.01)
*C01G 53/00* (2006.01)
(Continued)

(52) U.S. Cl.
CPC ............. *C01G 53/42* (2013.01); *C01G 53/50* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

| 2,165,128 A | 7/1939 | Cheesman |
| 4,443,186 A | 4/1984 | Shell |

(Continued)

FOREIGN PATENT DOCUMENTS

| CN | 1520621 A | 8/2004 |
| CN | 1701451 A | 11/2005 |

(Continued)

OTHER PUBLICATIONS

International Preliminary Report on Patentability mailed Oct. 10, 2013 in co-pending PCT application No. PCT/JP0212/057974.
(Continued)

*Primary Examiner* — Ula C Ruddock
*Assistant Examiner* — Matthew Van Oudenaren
(74) *Attorney, Agent, or Firm* — Nields, Lemack & Frame, LLC

(57) ABSTRACT

The present invention provides a positive electrode active material for lithium ion battery having good rate characteristics. The positive electrode active material for lithium ion battery has a layer structure expressed by a composition formula: $Li_x(Ni_yM_{1-y})O_z$, wherein M represents Mn and Co, x represents 0.9 to 1.2, y represents 0.6 to 0.9, and z represents 1.8 to 2.4. The positive electrode active material has a particle size ratio D50P/D50 of 0.60 or more, wherein D50 is the average secondary particle size of the positive electrode active material powder, and D50P is the average secondary particle size of the positive electrode active material powder after pressing at 100 MPa. The positive electrode active material contains 3% or less particles having a particle size of 0.4 μm or less in terms of the volume ratio after pressing at 100 MPa.

12 Claims, 1 Drawing Sheet

(51) Int. Cl.
  *H01M 4/505* (2010.01)
  *H01M 4/525* (2010.01)
  *H01M 10/0525* (2010.01)

(52) U.S. Cl.
  CPC ....... *H01M 10/0525* (2013.01); *C01P 2002/54* (2013.01); *C01P 2004/51* (2013.01); *C01P 2004/62* (2013.01); *C01P 2006/40* (2013.01); *Y02E 60/122* (2013.01)

(56) References Cited

U.S. PATENT DOCUMENTS

| | | |
|---|---|---|
| 4,469,654 A | 9/1984 | Haskett et al. |
| 5,393,622 A | 2/1995 | Nitta et al. |
| 5,478,674 A | 12/1995 | Miyasaka |
| 5,759,714 A | 6/1998 | Matsufuji et al. |
| 6,037,095 A | 3/2000 | Miyasaka |
| 6,123,911 A | 9/2000 | Yamaguchi et al. |
| 6,423,447 B1 | 7/2002 | Ohsaki et al. |
| 6,582,854 B1 | 6/2003 | Qi et al. |
| 6,984,469 B2 | 1/2006 | Kweon et al. |
| 7,332,248 B2 | 2/2008 | Kase et al. |
| 7,410,728 B1 | 8/2008 | Fujimoto et al. |
| 7,645,542 B2 | 1/2010 | Kase et al. |
| 8,354,191 B2 | 1/2013 | Shizuka et al. |
| 8,623,551 B2 | 1/2014 | Kawahashi et al. |
| 8,748,041 B2 | 6/2014 | Satoh et al. |
| 8,993,160 B2 | 3/2015 | Nagase |
| 2002/0106561 A1 | 8/2002 | Lee et al. |
| 2003/0082448 A1 | 5/2003 | Cho et al. |
| 2003/0104279 A1 | 6/2003 | Miyazaki et al. |
| 2003/0211391 A1 | 11/2003 | Cho et al. |
| 2004/0053134 A1 | 3/2004 | Ozaki et al. |
| 2004/0110063 A1 | 6/2004 | Uchitomi et al. |
| 2004/0197658 A1 | 10/2004 | Kase et al. |
| 2005/0079416 A1 | 4/2005 | Ohzuku et al. |
| 2005/0142442 A1 | 6/2005 | Yuasa et al. |
| 2005/0158546 A1 | 7/2005 | Shizuka |
| 2006/0083989 A1 | 4/2006 | Suhara et al. |
| 2006/0121350 A1 | 6/2006 | Kajiya et al. |
| 2006/0127765 A1 | 6/2006 | Machida et al. |
| 2006/0204849 A1 | 9/2006 | Saito et al. |
| 2006/0233696 A1 | 10/2006 | Paulsen et al. |
| 2006/0281005 A1 | 12/2006 | Cho et al. |
| 2007/0015058 A1 | 1/2007 | Takezawa et al. |
| 2007/0141469 A1 | 6/2007 | Tokunaga et al. |
| 2007/0202405 A1 | 8/2007 | Shizuka et al. |
| 2007/0248883 A1 | 10/2007 | Oda et al. |
| 2007/0298512 A1 | 12/2007 | Park et al. |
| 2008/0044736 A1 | 2/2008 | Nakura |
| 2008/0081258 A1 | 4/2008 | Kim et al. |
| 2009/0117464 A1 | 5/2009 | Cho et al. |
| 2009/0117469 A1* | 5/2009 | Hiratsuka et al. ........... 429/231.8 |
| 2009/0148772 A1 | 6/2009 | Kawasato et al. |
| 2009/0233176 A1 | 9/2009 | Kita et al. |
| 2009/0286164 A1* | 11/2009 | Wada et al. .................... 429/338 |
| 2009/0289218 A1 | 11/2009 | Kajiya et al. |
| 2009/0299922 A1 | 12/2009 | Malcus et al. |
| 2009/0305136 A1 | 12/2009 | Yada et al. |
| 2010/0015514 A1 | 1/2010 | Miyagi et al. |
| 2010/0019194 A1 | 1/2010 | Fujiwara et al. |
| 2010/0112447 A1 | 5/2010 | Yamamoto et al. |
| 2010/0143583 A1 | 6/2010 | Honda et al. |
| 2010/0183922 A1 | 7/2010 | Cho et al. |
| 2010/0209757 A1 | 8/2010 | Ooyama et al. |
| 2010/0209771 A1 | 8/2010 | Shizuka et al. |
| 2010/0227222 A1 | 9/2010 | Chang et al. |
| 2011/0031437 A1 | 2/2011 | Nagase et al. |
| 2011/0033749 A1 | 2/2011 | Uchida et al. |
| 2011/0076558 A1 | 3/2011 | Miyazaki et al. |
| 2011/0250499 A1 | 10/2011 | Hiratsuka |
| 2012/0034525 A1 | 2/2012 | Satoh et al. |
| 2012/0231342 A1 | 9/2012 | Satoh et al. |
| 2012/0231343 A1 | 9/2012 | Nagase et al. |
| 2012/0244434 A1 | 9/2012 | Nagase |
| 2012/0292562 A1 | 11/2012 | Kajiya et al. |
| 2012/0319036 A1 | 12/2012 | Kajiya et al. |
| 2012/0319037 A1 | 12/2012 | Kawahashi et al. |
| 2012/0319039 A1 | 12/2012 | Satoh |
| 2012/0319040 A1 | 12/2012 | Okamoto et al. |
| 2012/0321956 A1 | 12/2012 | Kawahashi et al. |
| 2012/0326080 A1 | 12/2012 | Okamoto et al. |
| 2012/0326098 A1 | 12/2012 | Satoh |
| 2012/0326099 A1 | 12/2012 | Satoh |
| 2012/0326101 A1 | 12/2012 | Satoh |
| 2012/0326102 A1 | 12/2012 | Satoh |
| 2013/0001463 A1 | 1/2013 | Okamoto et al. |
| 2013/0043428 A1 | 2/2013 | Kawahashi et al. |
| 2013/0108921 A1 | 5/2013 | Kase et al. |
| 2013/0143121 A1 | 6/2013 | Kobayashi et al. |
| 2013/0175470 A1 | 7/2013 | Kajiya et al. |
| 2013/0221271 A1 | 8/2013 | Nagase et al. |
| 2013/0316239 A1 | 11/2013 | Okamoto |
| 2014/0306152 A1 | 10/2014 | Okamoto |
| 2014/0339465 A1 | 11/2014 | Okamoto |
| 2014/0339466 A1 | 11/2014 | Okamoto |
| 2015/0123029 A1 | 5/2015 | Nagase et al. |

FOREIGN PATENT DOCUMENTS

| | | |
|---|---|---|
| CN | 1710735 A | 12/2005 |
| CN | 1947288 A | 4/2007 |
| CN | 101478044 A | 7/2009 |
| EP | 0794155 A1 | 9/1997 |
| EP | 0903796 A1 | 3/1999 |
| EP | 1244164 A1 | 9/2002 |
| EP | 1317008 A2 | 6/2003 |
| EP | 1391950 A1 | 2/2004 |
| EP | 1450423 A1 | 8/2004 |
| EP | 1742281 A1 | 1/2007 |
| EP | 2023426 A1 | 2/2009 |
| EP | 2207226 A1 | 7/2010 |
| EP | 2207227 A1 | 7/2010 |
| EP | 2219251 A1 | 8/2010 |
| EP | 2533333 A1 | 12/2012 |
| JP | 4-328277 A | 11/1992 |
| JP | 6-275274 A | 9/1994 |
| JP | 7-29603 A | 1/1995 |
| JP | 7-211311 A | 8/1995 |
| JP | 8-138669 A | 5/1996 |
| JP | 8-213015 A | 8/1996 |
| JP | 09-82325 A | 3/1997 |
| JP | 9-120813 A | 5/1997 |
| JP | 9-270257 A | 10/1997 |
| JP | 10-83815 A | 3/1998 |
| JP | 10-116618 A | 5/1998 |
| JP | 10-188986 A | 7/1998 |
| JP | 10-206322 A | 8/1998 |
| JP | 10-208744 A | 8/1998 |
| JP | 10-302779 A | 11/1998 |
| JP | 10-321224 A | 12/1998 |
| JP | 11-16573 A | 1/1999 |
| JP | 11-67205 A | 3/1999 |
| JP | 11-273676 A | 10/1999 |
| JP | 11-292542 A | 10/1999 |
| JP | 11-307094 A | 11/1999 |
| JP | 11-345615 A | 12/1999 |
| JP | 2000-30693 A | 1/2000 |
| JP | 2000-72445 A | 3/2000 |
| JP | 2000-149945 A | 5/2000 |
| JP | 2000-215884 A | 8/2000 |
| JP | 2000-348721 A | 12/2000 |
| JP | 2001-110420 A | 4/2001 |
| JP | 2001-148249 A | 5/2001 |
| JP | 2001-223008 A | 8/2001 |
| JP | 2001-266851 A | 9/2001 |
| JP | 2002-63901 A | 2/2002 |
| JP | 2002-124261 A | 4/2002 |
| JP | 3276183 B2 | 4/2002 |
| JP | 2002-164053 A | 6/2002 |
| JP | 2002-203552 A | 7/2002 |
| JP | 2002-216745 A | 8/2002 |
| JP | 2002-260655 A | 9/2002 |
| JP | 2002-289261 A | 10/2002 |

(56) References Cited

FOREIGN PATENT DOCUMENTS

| | | |
|---|---|---|
| JP | 2002-298914 A | 10/2002 |
| JP | 3334179 B2 | 10/2002 |
| JP | 2003-7299 A | 1/2003 |
| JP | 2003-17052 A | 1/2003 |
| JP | 2003-81637 A | 3/2003 |
| JP | 2003-151546 A | 5/2003 |
| JP | 2003-229129 A | 8/2003 |
| JP | 2004-6264 A | 1/2004 |
| JP | 2004-146374 A | 5/2004 |
| JP | 2004-172109 A | 6/2004 |
| JP | 2004-193115 A | 7/2004 |
| JP | 2004-214187 A | 7/2004 |
| JP | 2004-227790 A | 8/2004 |
| JP | 2004-253169 A | 9/2004 |
| JP | 2004-273451 A | 9/2004 |
| JP | 2004-355824 A | 12/2004 |
| JP | 2004-356094 A | 12/2004 |
| JP | 2005-11713 A | 1/2005 |
| JP | 2005-44743 A | 2/2005 |
| JP | 2005-53764 A | 3/2005 |
| JP | 2005-56602 A | 3/2005 |
| JP | 2005-60162 A | 3/2005 |
| JP | 2005-75691 A | 3/2005 |
| JP | 2005-183366 A | 7/2005 |
| JP | 2005-225734 A | 8/2005 |
| JP | 2005-235624 A | 9/2005 |
| JP | 2005-243636 A | 9/2005 |
| JP | 2005-251700 A | 9/2005 |
| JP | 2005-285572 A | 10/2005 |
| JP | 2005-289700 A | 10/2005 |
| JP | 2005-302507 A | 10/2005 |
| JP | 2005-302628 A | 10/2005 |
| JP | 2005-324973 A | 11/2005 |
| JP | 2005-327644 A | 11/2005 |
| JP | 2005-332707 A | 12/2005 |
| JP | 2005-347134 A | 12/2005 |
| JP | 2006-4724 A | 1/2006 |
| JP | 2006-19229 A | 1/2006 |
| JP | 2006-19310 A | 1/2006 |
| JP | 2006-54159 A | 2/2006 |
| JP | 2006-107818 A | 4/2006 |
| JP | 2006-107845 A | 4/2006 |
| JP | 2006-127923 A | 5/2006 |
| JP | 2006-127955 A | 5/2006 |
| JP | 2006-134816 A | 5/2006 |
| JP | 2006-134852 A | 5/2006 |
| JP | 2006-156126 A | 6/2006 |
| JP | 2006-156235 A | 6/2006 |
| JP | 2006-164758 A | 6/2006 |
| JP | 2006-286614 A | 10/2006 |
| JP | 3835266 B2 | 10/2006 |
| JP | 2006-302542 A | 11/2006 |
| JP | 2006-351379 A | 12/2006 |
| JP | 2007-48744 A | 2/2007 |
| JP | 2007-95443 A | 4/2007 |
| JP | 2007-194202 A | 8/2007 |
| JP | 2007-214138 A | 8/2007 |
| JP | 2007-226969 A | 9/2007 |
| JP | 2007-227368 A | 9/2007 |
| JP | 2007-257890 A | 10/2007 |
| JP | 2007-280723 A | 10/2007 |
| JP | 2008-13405 A | 1/2008 |
| JP | 4070585 B2 | 4/2008 |
| JP | 2008-103132 A | 5/2008 |
| JP | 2008-181708 A | 8/2008 |
| JP | 2008-192547 A | 8/2008 |
| JP | 2008-266136 A | 11/2008 |
| JP | 2008-277106 A | 11/2008 |
| JP | 4175026 B2 | 11/2008 |
| JP | 2008-544468 A | 12/2008 |
| JP | 2009-117365 A | 5/2009 |
| JP | 2009-135070 A | 6/2009 |
| JP | 2009-151959 A | 7/2009 |
| JP | 4287901 B2 | 7/2009 |
| JP | 2009-289726 A | 12/2009 |
| JP | 2010-15959 A | 1/2010 |
| JP | 2010-47466 A | 3/2010 |
| JP | 2010-192200 A | 9/2010 |
| JP | 2011-44364 A | 3/2011 |
| JP | 2012-169224 A | 9/2012 |
| JP | 2012-243572 A | 12/2012 |
| JP | 2013-152911 A | 8/2013 |
| KR | 10-2010-0060362 A | 6/2010 |
| TW | 363940 | 7/1999 |
| WO | 02/086993 A1 | 10/2002 |
| WO | 03/003489 A1 | 1/2003 |
| WO | 2004/064180 A1 | 7/2004 |
| WO | 2007/072759 A1 | 6/2007 |
| WO | 2008/084679 A1 | 7/2008 |
| WO | 2009/011157 A1 | 1/2009 |
| WO | 2009/060603 A1 | 5/2009 |
| WO | 2009/063838 A1 | 5/2009 |
| WO | 2009/128289 A1 | 10/2009 |
| WO | 2010/049977 A1 | 5/2010 |
| WO | 2010/113512 A1 | 10/2010 |
| WO | 2010/113583 A1 | 10/2010 |
| WO | 2011/007751 A1 | 1/2011 |
| WO | 2011/065391 A1 | 6/2011 |
| WO | 2011/108720 A1 | 9/2011 |
| WO | 2011/122448 A1 | 10/2011 |
| WO | 2012/098724 A1 | 7/2012 |
| WO | 2012/132071 A1 | 10/2012 |
| WO | 2012/132072 A1 | 10/2012 |
| WO | 2012/157143 A1 | 11/2012 |

OTHER PUBLICATIONS

Office Action mailed Dec. 4, 2013 in co-pending U.S. Appl. No. 13/508,880.
Office Action mailed Dec. 18, 2013 in co-pending U.S. Appl. No. 13/514,080.
Final Rejection mailed Jan. 9, 2014 in co-pending U.S. Appl. No. 13/576,548.
Notice of Allowance mailed Nov. 6, 2013 in U.S. Appl. No. 13/582,091, now US Patent No. 8,623,551.
Int. J. Electrochem. Sci., vol. 4, 2009, pp. 1770-1778, "Improved High Rate Cycling of Li-rich Li(1.10)Ni(1/3)Co(1/3)Mn(1/3)O(2) Cathode for Lithium Batteries", Santhanam, et al.
Notice of Allowance mailed Mar. 20, 2014 in co-pending U.S. Appl. No. 13/258,120.
Final Rejection mailed Feb. 27, 2014 in co-pending U.S. Appl. No. 13/856,514.
Final Rejection mailed Jan. 27, 2014 in co-pending U.S. Appl. No. 13/581,546.
Final Rejection mailed Jan. 24, 2014 in co-pending U.S. Appl. No. 13/582,067.
Final Rejection mailed Jan. 27, 2014 in co-pending U.S. Appl. No. 13/581,814.
Final Rejection mailed Feb. 20, 2014 in co-pending U.S. Appl. No. 13/582,096.
Final Rejection mailed Feb. 7, 2014 in co-pending U.S. Appl. No. 13/582,101.
Final Rejection mailed Feb. 18, 2014 in co-pending U.S. Appl. No. 13/582,113.
International Preliminary Report on Patentability mailed Jul. 31, 2014 in co-pending PCT application No. PCT/JP2012/074263.
International Preliminary Report on Patentability mailed Jul. 31, 2014 in co-pending PCT application No. PCT/JP2012/074266.
Journal of The Electrochemical Society, 151 (11), 2004, pp. A1899-A1904, "Synthesis, Thermal, and Electrochemical Properties of AlPo4-Coated LiNi0.8Co0.1Mn0.1O2 Cathode Materials for Li-Ion Cell", Cho, et al.
Journal of The Electrochemical Society, 155 (3), 2008, pp. A239-A245, "Storage Characteristics of LiNi0.8Co0.1+xMn0.1-xO2 (x=0, 0.03, and 0.06) Cathode Materials for Lithium Ion Batteries", EOM, et al.
Machine English translation for CN 1710735 (2005), 9 pages, European Patent Office, http://translationportal.epo.org . . . , retrieved from the internet Oct. 6, 2014.

(56) References Cited

OTHER PUBLICATIONS

Final Rejection mailed Sep. 18, 2014 in co-pending U.S. Appl. No. 13/508,887.
Office Action mailed Sep. 18, 2014 in co-pending U.S. Appl. No. 13/856,514.
Office Action mailed Oct. 9, 2014 in co-pending U.S. Appl. No. 13/695,663.
Office Action mailed Sep. 9, 2014 in co-pending U.S. Appl. No. 13/514,080.
Office Action mailed Oct. 2, 2014 in co-pending U.S. Appl. No. 13/582,089.
Office Action mailed Oct. 3, 2014 in co-pending U.S. Appl. No. 13/581,730.
International Search Report mailed Jun. 8, 2010 in co-pending PCT application No. PCT/JP2010/053443.
International Preliminary Report on Patentability mailed Nov. 17, 2011 in co-pending PCT application No. PCT/JP2010/053443.
International Search Report mailed May 24, 2011 in co-pending PCT application No. PCT/JP2011/053271.
International Search Report/Written Opinion mailed Mar. 8, 2011 in co-pending PCT application No. PCT/JP2010/071723.
International Preliminary Report on Patentability mailed Jul. 12, 2012 in co-pending PCT application No. PCT/JP2010/071723.
International Search Report mailed Jan. 24, 2012 in co-pending PCT application No. PCT/JP2011/072860.
International Search Report/Written Opinion mailed Jan. 25, 2011 in co-pending PCT application No. PCT/JP2010/071724.
International Preliminary Report on Patentability issued Jul. 10, 2012 in co-pending PCT application No. PCT/JP2010/071724.
International Search Report mailed Apr. 26, 2011 in co-pending PCT application No. PCT/JP2011/052394.
International Preliminary Report on Patentability mailed Oct. 11, 2012 in co-pending PCT application No. PCT/JP2011/052394.
International Search Report mailed May 10, 2011 in co-pending PCT application No. PCT/JP2011/052399.
International Preliminary Report on Patentability mailed Oct. 11, 2012 in co-pending PCT application No. PCT/JP2011/052399.
International Search Report mailed Nov. 15, 2011 in co-pending PCT application No. PCT/JP2011/069042.
International Search Report/Written Opinion mailed Jun. 7, 2011 in co-pending PCT application No. PCT/JP2011/054935.
International Preliminary Report on Patentability mailed Oct. 11, 2012 in co-pending PCT application No. PCT/JP2011/054935.
International Search Report mailed Jun. 7, 2011 in co-pending PCT application No. PCT/JP2011/054938.
International Search Report/Written Opinion mailed May 17, 2011 in co-pending PCT application No. PCT/JP2011/054942.
International Preliminary Report on Patentability issued Oct. 2, 2012 in co-pending PCT application No. PCT/JP2011/054942.
International Search Report/Written Opinion mailed Jun. 7, 2011 in co-pending PCT application No. PCT/JP2011/054934.
International Preliminary Report on Patentability mailed Oct. 11, 2012 in co-pending PCT application No. PCT/JP2011/054934.
International Search Report/Written Opinion mailed May 17, 2011 in co-pending PCT application No. PCT/JP2011/054941.
International Preliminary Report on Patentability issued Oct. 2, 2012 in co-pending PCT application No. PCT/JP2011/054941.
International Search Report mailed May 10, 2011 in co-pending PCT application No. PCT/JP2011/055111.
International Search Report/Written Opinion mailed May 17, 2011 in corresponding PCT application No. PCT/JP2011/053710.
International Preliminary Report on Patentability issued Oct. 2, 2012 in corresponding PCT application No. PCT/JP2011/053710.
International Search Report/Written Opinion mailed May 24, 2011 in co-pending PCT application No. PCT/JP2011/054777.
International Preliminary Report on Patentability issued Oct. 2, 2012 in co-pending PCT application No. PCT/JP2011/054777.
International Search Report mailed May 24, 2011 in co-pending PCT application No. PCT/JP2011/054781.
Written Opinion mailed Jun. 24, 2011 in co-pending PCT application No. PCT/JP2011/054781.
International Preliminary Report on Patentability mailed Oct. 11, 2012 n co-pending PCT application No. PCT/JP2011/054781.
International Search Report/Written Opinion mailed May 24, 2011 in co-pending PCT application No. PCT/JP2011/054779.
International Preliminary Report on Patentability issued Oct. 2, 2012 in co-pending PCT application No. PCT/JP2011/054779.
Electrochimica Acta, vol. 51, 2006, pp. 5581-5586, "Preparation and electrochemical properties of $LiCoO_2$—$LiNi0.5Mn0.5O2$—$Li_2MnO_3$ solid solutions with high Mn contents", Sun, et al.
International Preliminary Report on Patentability mailed Nov. 22, 2012 in co-pending PCT application No. PCT/JP2011/054938.
International Preliminary Report on Patentability mailed Nov. 22, 2012 in co-pending PCT application No. PCT/JP2011/055111.
International Search Report mailed Nov. 1, 2011 in co-pending PCT application No. PCT/JP2011/066722.
International Search Report mailed Apr. 10, 2012 in co-pending PCT application No. PCT/JP2011/079535.
Office Action-Restriction-mailed Mar. 12, 2013 in co-pending U.S. Appl. No. 13/508,887.
Office Action mailed Mar. 13, 2013 in co-pending U.S. Appl. No. 13/582,091.
European communication issued May 9, 2014 in co-pending European patent application No. EP 11739870.1.
Chinese communication dated May 12, 2014 in corresponding Chinese patent application No. CN 201180008573.3.
European communication issued May 9, 2014 in co-pending European patent application No. EP 11750704.6.
European communication issued May 22, 2014 in co-pending European patent application No. EP 11750705.3.
European communication issued May 6, 2014 in co-pending European patent application No. EP 11845955.1.
International Search Report mailed Dec. 25, 2012 in co-pending PCT application No. PCT/JP2012/074263.
International Search Report mailed Dec. 25, 2012 in co-pending PCT application No. PCT/JP2012/074266.
International Search Report mailed Dec. 25, 2012 in co-pending PCT application No. PCT/JP2013/064941.
Final Rejection mailed Jun. 18, 2014 in co-pending U.S. Appl. No. 13/508,880.
Final Rejection mailed Jun. 3, 2014 in co-pending U.S. Appl. No. 13/514,080.
Office Action mailed Jul. 1, 2014 in co-pending U.S. Appl. No. 13/576,548.
Office Action mailed Jul. 8, 2014 in co-pending U.S. Appl. No. 13/576,753.
International Preliminary Report on Patentability mailed Sep. 26, 2013 in co-pending PCT application No. PCT/JP2011/053271.
International Preliminary Report on Patentability mailed Oct. 10, 2013 in co-pending PCT application No. PCT/JP2011/072860.
International Preliminary Report on Patentability mailed Aug. 1, 2013 in co-pending PCT application No. PCT/JP2011/069042.
Japanese Communication mailed Oct. 1, 2013 in co-pending Japanese patent application No. JP 2012-503253.
Japanese Communication mailed Oct. 1, 2013 in co-pending Japanese patent application No. JP 2012-503255.
Japanese Communication mailed Oct. 1, 2013 in co-pending Japanese patent application No. JP 2012-503252.
International Preliminary Report on Patentability mailed Jun. 13, 2013 in co-pending PCT application No. PCT/JP2011/066722.
International Search Report mailed Jun. 5, 2012 in co-pending PCT application No. PCT/JP2012/057974.
International Journal of Inorganic Materials 3 (2001), pp. 323-329, "Structural and electrochemical properties of Li—Ni—Co oxides synthesized by wet chemistry via a succinic-acid-assisted technique", Castro-Garcia, et al.
Office Action mailed Oct. 3, 2013 in co-pending U.S. Appl. No. 13/258,120.
Final Rejection mailed Sep. 19, 2013 in co-pending U.S. Appl. No. 13/508,887.
Office Action mailed Sep. 17, 2013 in co-pending U.S. Appl. No. 13/856,514.

(56) References Cited

OTHER PUBLICATIONS

Office Action mailed Jun. 10, 2013 in co-pending U.S. Appl. No. 13/508,887.
Office Action mailed Jul. 16, 2013 in co-pending U.S. Appl. No. 13/514,080.
Office Action mailed Jul. 29, 2013 in co-pending U.S. Appl. No. 13/576,548.
Office Action mailed Aug. 1, 2013 in co-pending U.S. Appl. No. 13/581,546.
Office Action mailed Jul. 17, 2013 in co-pending U.S. Appl. No. 13/581,814.
Office Action mailed Jun. 19, 2013 in co-pending U.S. Appl. No. 13/582,096.
Office Action mailed Jul. 12, 2013 in co-pending U.S. Appl. No. 13/582,101.
Office Action mailed Jul. 15, 2013 in co-pending U.S. Appl. No. 13/582,113.
Office Action mailed Aug. 13, 2013 in co-pending U.S. Appl. No. 13/582,067.
European communication dated Oct. 27, 2014 in co-pending European patent application No. EP 10839166.5.
European communication dated Nov. 5, 2014 in co-pending European patent application No. EP 11856183.6.
European communication dated Oct. 20, 2014 in co-pending European patent application No. EP 12763420.2.
Office Action mailed Nov. 14, 2014 in co-pending U.S. Appl. No. 13/582,096.
European Communication dated Jan. 5, 2015 in co-pending European patent application No. 11842456.3.
European Communication dated Dec. 9, 2014 in co-pending European patent application No. 11750768.1.
Japanese communication mailed Apr. 7, 2015 in co-pending Japanese patent application No. 2012-503258.
European Communication dated Dec. 9, 2014 in co-pending European patent application No. 11750762.4.
European Communication dated Feb. 17, 2015 in co-pending European patent application No. 11865511.7.
Chinese Communication dated Jan. 12, 2015 in co-pending Chinese patent application No. 201280004477.6.
International Preliminary Report on Patentability mailed Mar. 19, 2015 in co-pending PCT application No. PCT/JP2013/064941.
International Search Report mailed Jan. 7, 2014 in co-pending PCT application No. PCT/JP2013/076598.
International Preliminary Report on Patentability mailed Apr. 2, 2015 in co-pending PCT application No. PCT/JP2013/076598.
Journal of the The Electrochemical Society, vol. 151, No. 10, Sep. 2004, pp. A1707-A1711, "Comparison of Overcharge Behavior of AlPo4-Coated LiCoO2 and LiNi0.8Co0.1Mn0.1O2 Cathode Materials in Li-Ion Cells", Cho, et al.
Journal of Power Sources, vol. 146, 2005, pp. 39-44, "Performance of LiNiCoO2 materials for advanced lithium-ion batteries", Itou, et al.
Ceramics International, vol. 35, No. 4, May 2009, pp. 1633-1639, "Fine-sized LiNi0.8Co0.15Mn0.05O2 cathode particles prepared by spray pyrolysis from the polymeric precursor solutions", Ju, et al.
Journal of Alloys and Compounds, vol. 469, No. 1-2, Feb. 2009, pp. 304-309, "Effects of the ratio of manganese and nickel components on the characteristics of Lix(MnyNi1-y)Oz cathode powders prepared by spray pyrolysis", Ju, et al.
Journal of Power Sources, vol. 153, No. 2, Feb. 2006, pp. 345-349, "Improvement of 12V overcharge behavior of LiCoO2 cathode material by LiNi0.8Co0.1Mn0.1O2 addition in a Li-ion cell", Kim, et al.
Journal of Applied Electrochemistry, vol. 38, No. 5, Jan. 2008, pp. 613-617, "Comparative study of the preparation and electrochemical performance of LiNi1/2Mn1/2O2 electrode material for rechargeable lithium batteries", Lian, et al.
Wikipedia, Karl Fischer Titration article, Waybackmachine.com snapshot dtd., Sep. 12, 2010, 2 pages.
Office Action mailed Feb. 25, 2015 in co-pending U.S. Appl. No. 13/508,880.
Final Rejection mailed Feb. 24, 2015 in co-pending U.S. Appl. No. 13/695,663.
Notice of Allowance mailed Jan. 15, 2015 in co-pending U.S. Appl. No. 13/514,080 (now US Patent No. 8,993,169).
Final Rejection mailed Dec. 23, 2015 in co-pending U.S. Appl. No. 13/576,548.
Final Rejection mailed Jan. 28, 2015 in co-pending U.S. Appl. No. 13/576,753.
Office Action—Restriction—mailed Jan. 26, 2015 in co-pending U.S. Appl. No. 13/581,423.
Office Action mailed Mar. 25, 2015 in co-pending U.S. Appl. No. 13/581,423.
Final Rejection mailed Feb. 12, 2015 in co-pending U.S. Appl. No. 13/582,089.
Final Rejection mailed Feb. 27, 2015 in co-pending U.S. Appl. No. 13/581,730.
Office Action mailed Feb. 26, 2015 in co-pending U.S. Appl. No. 13/582,101.
Office Action mailed Feb. 26, 2015 in co-pending U.S. Appl. No. 13/582,113.
Office Action mailed Mar. 18, 2015 in co-pending U.S. Appl. No. 13/816,822.
Office Action mailed Apr. 3, 2015 in co-pending U.S. Appl. No. 13/822,447.
Office Action mailed May 14, 2015 in co-pending U.S. Appl. No. 13/984,947.
Office Action mailed Apr. 23, 2015 in co-pending U.S. Appl. No. 14/364,795.
Office Action mailed Apr. 3, 2015 in co-pending U.S. Appl. No. 14/364,809.
Office Action mailed Apr. 3, 2015 in co-pending U.S. Appl. No. 14/364,830.

* cited by examiner

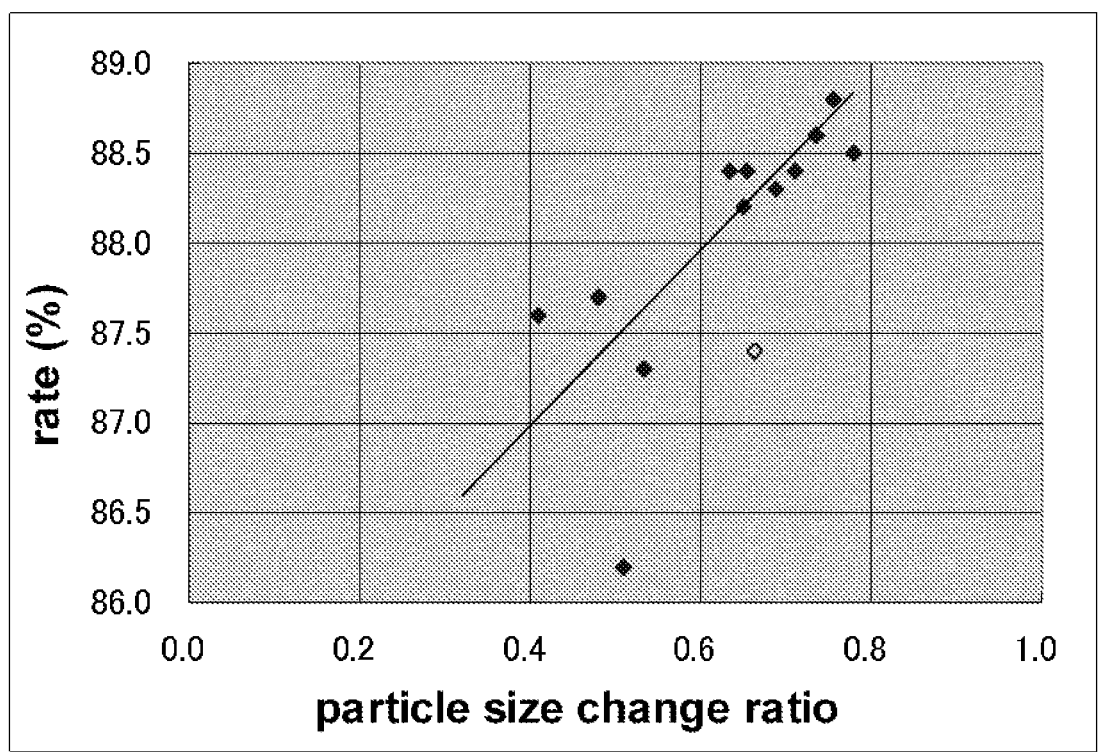

POSITIVE ELECTRODE ACTIVE MATERIAL FOR LITHIUM-ION BATTERY, POSITIVE ELECTRODE FOR LITHIUM-ION BATTERY, AND LITHIUM-ION BATTERY

BACKGROUND OF THE INVENTION

1. Field of the Invention

The present invention relates to a positive electrode active material for lithium ion battery, a positive electrode for lithium ion battery, and a lithium ion battery.

2. Description of Related Art

In general, as positive electrode active materials for lithium ion batteries, lithium-containing transition metal oxides are used. Specific examples thereof include lithium cobaltate ($LiCoO_2$), lithium nickelate ($LiNiO_2$), and lithium manganate ($LiMn_2O_4$). In order to improve characteristics (high capacity, cycling characteristics, storage characteristics, internal resistance reduction, and rate characteristics) and safety, combination of these oxides is progressed. Lithium ion batteries for large-size applications such as those for automobiles and road leveling are required to have different characteristics from prior art batteries for cellular telephones and personal computers. In particular, special emphasis is placed on good rate characteristics.

Improvement of rate characteristics has been attempted by various methods. For example, Patent document 1 discloses a layered lithium nickel complex oxide powder for lithium secondary battery positive electrode material composed of secondary particles prepared by aggregation of primary particles, the layered lithium nickel complex oxide powder for lithium secondary battery positive electrode material having a bulk density of 2.0 g/cc or more, an average primary particle size B of 0.1 to 1 μm, the secondary particles having a median diameter A of 9 to 20 μm, the ratio of the median diameter A of the secondary particles to the average primary particle size B, or A/B being from 10 to 200. The document describes that it provides a high density layered lithium nickel complex oxide powder for lithium secondary battery positive electrode material which allows the production of a lithium secondary battery having a high capacity and good rate characteristics.
(Patent document 1) Japanese Patent Application Publication No. 2007-214138

SUMMARY OF THE INVENTION

However, good rate characteristics are important characteristics required for batteries, and there is some room for improvement to provide a positive electrode active material for high quality lithium ion battery.

Accordingly, the present invention is intended to provide a positive electrode active material for lithium ion battery having good rate characteristics.

As a result of dedicated research by the inventors, they have found that the variation in the particle size of secondary particles caused by pressing of the positive electrode active material is closely related with the rate characteristics of the battery produced using the active material. More specifically, making process of an electrode includes a pressing step, and the particle size of the secondary particles of the positive electrode active material after pressing directly influences the capacity of the battery produced using the active material. The fact that the particle size of secondary particles of the positive electrode active material markedly changes depending on the change of the pressure means the destruction and deformation of the particles, and suggests that the particles have low strength. Such particles may be electrochemically unstable. As a result of study from this viewpoint, the inventors have found that the rate characteristics of a battery increases with the decrease of the variation in the particle size of the secondary particles of positive electrode active material depending on the change of the press pressure.

An aspect of the present invention accomplished based on the above-described findings is a positive electrode active material for lithium ion battery having a layer structure expressed by a composition formula: $Li_x(Ni_yM_{1-y})O_z$ (wherein M represents Mn and Co, x represents 0.9 to 1.2, y represents 0.6 to 0.9, and z represents 1.8 to 2.4), the positive electrode active material having a particle size ratio D50P/D50 of 0.60 or more, wherein D50 is the average secondary particle size of the positive electrode active material powder, and D50P is the average secondary particle size of the positive electrode active material powder after pressing at 100 MPa, and the positive electrode active material containing 3% or less particles having a particle size of 0.4 μm or less in terms of the volume ratio after pressing at 100 MPa.

The positive electrode active material for lithium ion battery according to one embodiment the present invention has a particle size ratio D50P/D50 of 0.65 or more.

The positive electrode active material for lithium ion battery according to another embodiment the present invention has a particle size ratio D50P/D50 of 0.70 or more.

The positive electrode active material for lithium ion battery according to yet another embodiment the present invention has an average secondary particle size of 2 to 8 μm in the form of powder.

Another aspect of the present invention is a positive electrode for lithium ion battery including the positive electrode active material for lithium ion battery according to the present invention.

Yet another aspect of the present invention is a lithium ion battery including the positive electrode for lithium ion battery according to the present invention.

Advantageous Effect of the Invention

According to the present invention, a positive electrode active material for lithium ion battery having good rate characteristics is provided.

BRIEF DESCRIPTION OF THE DRAWINGS

FIG. 1 shows graphs showing the relationships between the particle size ratio (D50P/D50) and rate characteristics in Examples 1 to 8 and Comparative Examples 1 to 5 listed in Table 1.

DETAILED DESCRIPTION OF EMBODIMENTS (Structure of Positive Electrode Active Material for Lithium Ion Battery)

The material of the positive electrode active material for lithium ion battery of the present invention may be selected from a wide range of compounds which are useful as positive electrode active materials for common positive electrode for lithium ion batteries. In particular, the material is preferably a lithium-containing transition metal oxide such as lithium cobaltate ($LiCoO_2$), lithium nickelate ($LiNiO_2$), or lithium manganate ($LiMn_2O_4$). The positive electrode active material for lithium ion battery of the present invention made of this material is expressed by a composition formula: $Li_x(Ni_yM_{1-y})O_z$ (wherein M represents Mn and Co, x represents 0.9 to 1.2, y represents 0.6 to 0.9, and z represents 1.8 to 2.4), and has a layer structure.

The proportion of lithium to all the metals in the positive electrode active material for lithium ion battery is from 0.9 to 1.2. If the proportion is less than 0.9, maintenance of a stable crystal structure is difficult, and if more than 1.2, the excess portion of lithium forms other compound which will not work as an active material, and thus the battery cannot maintain a high capacity.

When the average secondary particle sizes of the powder of the positive electrode active material for lithium ion battery of the present invention before and after pressing at 100 MPa are expressed as D50 and D50P, respectively, the particle size ratio D50P/D50 is 0.60 or more. The reason for this is that the rate characteristics deteriorate if the particle size ratio D50P/D50 is less than 0.60. The particle size ratio D50P/D50 is preferably 0.65 or more, and even more preferably 0.70 or more.

The positive electrode active material for lithium ion battery of the present invention contains 3% or less particles having a particle size of 0.4 μm or less in terms of the volume ratio after pressing at 100 MPa. If the fine powder having a particle size of 0.4 μm or less occurring after pressing exceeds 3% in terms of the volume ratio, the contact between the active material and the conductive material added during making of an electrode may be insufficient in making of a battery, and thus electrical resistance may increase. As a result of this, deterioration of the battery characteristics can occur particularly in the large current region. On the other hand, the positive electrode active material for lithium ion battery of the present invention contains 3% or less particles having a particle size of 0.4 μm or less in terms of the volume ratio after pressing at 100 MPa, so that it favorably contacts with the conductive material added during making of an electrode, and thus the above-described problems are successively prevented.

The positive electrode active material for lithium ion battery is composed of primary particles, secondary particles formed by aggregation of the primary particles, or a mixture of the primary and secondary particles. For convenience, the average particle size of these independent particles is hereinafter referred to as average secondary particle size. The average secondary particle size of the positive electrode active material for lithium ion battery is preferably 2 to 8 μm.

If the average secondary particle size is less than 2 μm, application to a collector is difficult. If the average secondary particle size is more than 8 μm, voids tend to be formed during filling, and filling properties deteriorate. The average secondary particle size is more preferably 3 to 6 μm.

(Structure of Positive Electrode for Lithium Ion Battery and Lithium Ion Battery Using the Same)

The positive electrode for lithium ion battery according to one embodiment of the present invention has a structure made by, for example, applying a positive electrode mix, which has been prepared by mixing a positive electrode active material for lithium ion battery having the above-described structure, a conductive material, and a binder, to one side or both sides of a collector made of aluminum foil or the like. The lithium ion battery according to one embodiment of the present invention includes the positive electrode for lithium ion battery having this structure.

(Method for Producing Positive Electrode Active Material for Lithium Ion Battery)

In the next place, the method for producing the positive electrode active material for lithium ion battery according to one embodiment of the present invention is described in detail.

Firstly, a metal salt solution is prepared. The metal is Ni, Co, and Mn. The metal salt is a sulfate, chloride, nitrate, acetate or the like, and is particularly preferably a nitrate. The reason for this is that if the nitrate is contained as an impurity in the raw material to be calcined, the material may be calcined as it is and thus requires no washing process, and that the nitrate works as an oxidant, and promotes oxidation of the metal in the raw material to be calcined. The metals contained in the metal salt are adjusted so as to achieve the desired molar ratio. As a result of this, the molar ratio between the metals in the positive electrode active material is determined.

Subsequently, the lithium carbonate is suspended in pure water, and then the metal salt solution of any of the above-described metals is added to the suspension to make slurry of the metal carbonate solution. At that time, fine particles of lithium-containing carbonate are precipitated in the slurry. When the metal salt is a sulfate or chloride whose lithium compound will not react during heat treatment, the salt is washed with a saturated lithium carbonate solution, and then collected by filtration. When the metal salt is a nitrate or acetate whose lithium compound reacts as a raw lithium material during heat treatment, the salt is collected by filtration without washing, dried, and used as a precursor.

Subsequently, the lithium-containing carbonate collected by filtration is dried to obtain a powder of lithium salt complex (precursor for positive electrode active material for lithium ion battery).

Subsequently, a calcinating container having a predetermined volume is provided, and the powder of the precursor for the positive electrode active material for lithium ion battery is charged into the calcinating container. Subsequently, the calcinating container filled with the powder of the precursor for the positive electrode active material for lithium ion battery is transferred into a calcinating furnace, and heated for a predetermined time, thereby achieving calcination.

Thereafter, the powder is taken out from the calcinating container, and ground to obtain a positive electrode active material powder.

The positive electrode for lithium ion battery of the present invention is made by applying the positive electrode mix, which has been prepared as described above by mixing a positive electrode active material, a conductive material, and a binder, to one side or both sides of a collector made of aluminum foil or the like. The lithium ion battery of the present invention is made using the positive electrode for lithium ion battery.

EXAMPLES

Examples for affording better understandings of the present invention and its effects are described below, but the present invention will not be limited to these examples.

Examples 1 to 8 and Comparative Examples 1 to 5

Firstly, lithium carbonate in an amount described in Table 1 was suspended in pure water, and a metal salt solution was poured into the suspension at a rate of 1.6 L/hr. The metal salt solution was prepared in such a manner that the hydrates of nickel nitrate, cobalt nitrate and manganese nitrate were adjusted such that Ni:Mn:Co satisfies the composition ratio listed Table 1, and the number of moles of all the metals was 14 moles.

As a result of this treatment, fine particles of lithium-containing carbonate were precipitated in the solution, and the precipitate was collected by filtration using a filter press.

Subsequently, the precipitate was dried to obtain a lithium-containing carbonate (precursor for positive electrode material for lithium ion battery).

Subsequently, a calcinating container was prepared, and the calcinating container was filled with the lithium-containing carbonate. Subsequently, the calcinating container was placed in a calcinating furnace, the temperature was increased to the calcination temperature described in Table 1 over a period of 6 hours, heated at the temperature for 2 hours, and then the vessel was cooled to obtain an oxide. Subsequently, the oxide thus obtained was pulverized, and thus obtaining a powder of the lithium ion secondary battery positive electrode material.

(Evaluation)

The Li, Ni, Mn and Co contents in the positive electrode materials were measured by an inductively coupled plasma atomic emission spectrometer (ICP-AES), and the composition ratios (molar ratios) of the metals were calculated. As a result of X-ray diffraction, they were found to have a layer structure.

The average secondary particle size (D50) was 50% diameter in the particle size distribution measured by SALD-3000 manufactured by Shimadzu Co., Ltd.

For each of the positive electrode materials, 4 g of the powder was taken and charged into a dice having a diameter of 17.5 mm, and pressed at 100 MPa, and the average secondary particle size (D50P) was measured again. Subsequently, the D50P/D50 was calculated using these measurements. Furthermore, the volume ratio (%) of the particles having a particle size of 0.4 μm or less contained in the pressed powder was calculated.

The positive electrode material, conductive material, and binder were weighed at a proportion of 85:8:7. The positive electrode material and conductive material were mixed with a solution of the binder in an organic solvent (N-methylpyrrolidone) to make slurry, and the slurry was applied to Al foil, dried, and then pressed to make a positive electrode. Subsequently, a test coin cell of 2032 type including a Li counter electrode was made, with an electrolytic solution prepared by dissolving 1 M $LiPF_6$ in EC-DMC (1:1). The ratio of the battery capacity at a current density of 1 C to the battery capacity at a current density of 0.2 C was calculated, and thus determining the rate characteristics. These results are shown in Table 1. FIG. 1 shows graphs showing the relationships between the particle size ratio (D50P/D50) and rate characteristics in Examples 1 to 8 and Comparative Examples 1 to 5 listed in Table 1.

Examples 1 to 8 showed good rate characteristics.

Comparative Examples 1 to 5 showed inferior rate characteristics, because destruction of the particles and formation of fine particles frequently occurred by pressing.

What is claimed is:

1. A positive electrode active material for a lithium ion battery having a layer structure expressed by a composition formula:

$Li_x(Ni_yM_{1-y})O_z$, wherein M represents Mn and Co, x represents 0.9 to 1.2, y represents 0.6 to 0.9, and z represents 1.8 to 2.4, the positive electrode active material having a particle size ratio D50P/D50 of 0.60 or more, wherein D50 is the average secondary particle size of the positive electrode active material in powder form, and D50P is the average secondary particle size of the positive electrode active material in powder form after pressing at 100 MPa, and the positive electrode active material containing 3% or less particles having a particle size of 0.4 μm or less in terms of a volume ratio after pressing at 100 MPa.

2. The positive electrode active material for a lithium ion battery according to claim 1, having a particle size ratio D50P/D50 of 0.65 or more.

3. The positive electrode active material for a lithium ion battery according to claim 2, having a particle size ratio D50P/D50 of 0.70 or more.

4. The positive electrode active material for a lithium ion battery according to claim 1, having an average secondary particle size of 2 to 8 μm in the form of powder.

5. A positive electrode for a lithium ion battery comprising the positive electrode active material of claim 1.

6. A lithium ion battery comprising the positive electrode for lithium ion battery described in claim 5.

7. A positive electrode for a lithium ion battery comprising the positive electrode active material of claim 2.

8. A positive electrode for a lithium ion battery comprising the positive electrode active material of claim 3.

9. A positive electrode for a lithium ion battery comprising the positive electrode active material of claim 4.

10. A lithium ion battery comprising the positive electrode for lithium ion battery described in claim 7.

TABLE 1

| | $Li_2CO_3$ | composition(%) | | | calcination temperature | average secondary particle size(μm) | | particle size ratio | volume ratio(%) of the particles having a particle size of 0.4 μm or less after pressing | rate characteristics |
|---|---|---|---|---|---|---|---|---|---|---|
| | (g) | Ni | Mn | Co | (° C.) | D50 | D50P | (D50P/D50) | | (%) |
| Example 1 | 1424 | 65 | 20 | 15 | 860 | 2.494 | 1.773 | 0.71 | 2.2 | 88.4 |
| Example 2 | 1415 | 75 | 15 | 10 | 840 | 2.919 | 2.008 | 0.69 | 1.8 | 88.3 |
| Example 3 | 1415 | 80 | 10 | 10 | 840 | 3.048 | 2.243 | 0.74 | 1.5 | 88.6 |
| Example 4 | 1424 | 65 | 20 | 15 | 850 | 6.830 | 4.337 | 0.64 | 0.0 | 88.4 |
| Example 5 | 1424 | 70 | 15 | 15 | 860 | 2.854 | 2.226 | 0.78 | 1.0 | 88.5 |
| Example 6 | 1443 | 70 | 15 | 15 | 850 | 3.094 | 2.339 | 0.76 | 0.8 | 88.8 |
| Example 7 | 1415 | 80 | 10 | 10 | 830 | 7.097 | 4.649 | 0.66 | 0.0 | 88.4 |
| Example 8 | 1415 | 75 | 15 | 10 | 820 | 2.608 | 1.698 | 0.65 | 3.0 | 88.2 |
| Comparative Example 1 | 1415 | 75 | 15 | 10 | 820 | 5.372 | 2.201 | 0.41 | 2.5 | 87.6 |
| Comparative Example 2 | 1415 | 80 | 10 | 10 | 820 | 6.022 | 3.070 | 0.51 | 4.0 | 86.2 |
| Comparative Example 3 | 1424 | 70 | 15 | 15 | 830 | 6.863 | 3.294 | 0.48 | 4.5 | 87.7 |
| Comparative Example 4 | 1424 | 70 | 15 | 15 | 820 | 6.963 | 3.715 | 0.53 | 3.5 | 87.3 |
| Comparative Example 5 | 1443 | 65 | 20 | 15 | 850 | 2.789 | 1.852 | 0.66 | 3.6 | 87.4 |

11. A lithium ion battery comprising the positive electrode for lithium ion battery described in claim 8.

12. A lithium ion battery comprising the positive electrode for lithium ion battery described in claim 9.

\* \* \* \* \*